(12) United States Patent
Ricketts et al.

(10) Patent No.: US 8,265,837 B2
(45) Date of Patent: Sep. 11, 2012

(54) POSITIVE OPEN GRAIN SAVING UNLOADING SYSTEM

(75) Inventors: Jonathan E. Ricketts, Ephrata, PA (US); Jason L. Shonk, Lancaster, PA (US); Kevin F. Knapp, Leola, PA (US)

(73) Assignee: CNH America LLC, New Holland, PA (US)

( * ) Notice: Subject to any disclaimer, the term of this patent is extended or adjusted under 35 U.S.C. 154(b) by 513 days.

(21) Appl. No.: 12/533,387

(22) Filed: Jul. 31, 2009

(65) Prior Publication Data

US 2011/0029205 A1    Feb. 3, 2011

(51) Int. Cl.
*G06F 7/70*    (2006.01)
(52) U.S. Cl. ............... 701/50; 460/54; 198/671
(58) Field of Classification Search ............ 701/50; 460/54; 198/671
See application file for complete search history.

(56) References Cited

U.S. PATENT DOCUMENTS

| | | | |
|---|---|---|---|
| 1,721,257 A | 7/1929 | Payne | |
| 1,885,656 A | 11/1932 | Wallace | |
| 2,625,001 A | 1/1953 | Heun | |
| 3,815,781 A | 6/1974 | Armstrong et al. | |
| 4,164,327 A | 8/1979 | Clark | |
| 4,881,855 A * | 11/1989 | Rempel et al. | 406/53 |
| 6,591,974 B2 * | 7/2003 | Tofin et al. | 198/671 |
| 6,691,861 B2 | 2/2004 | Reimer et al. | |
| 7,584,836 B2 * | 9/2009 | McCully et al. | 198/671 |
| 7,585,213 B2 * | 9/2009 | Claerhout et al. | 460/103 |
| 2008/0149463 A1 * | 6/2008 | McCully et al. | 198/531 |
| 2008/0305843 A1 * | 12/2008 | Grotelueschen et al. | 460/119 |

FOREIGN PATENT DOCUMENTS

| | | |
|---|---|---|
| JP | 10215663 | 8/1998 |
| JP | 11187753 | 7/1999 |

* cited by examiner

*Primary Examiner* — Hussein A. Elchanti
(74) *Attorney, Agent, or Firm* — Michael G. Harms

(57) ABSTRACT

An unloading system for an agricultural harvesting machine for reducing grain loss by detaining a grain saver door after movement to a fully open position during the unloading process, and by rapidly returning the door to a closed position with sufficient force for urging grain in the door area back into an unloading tube a predetermined time after the unloading process pauses or ceases. The system can advantageously detain the door in the open position in the presence of varying or reduced amounts of grain for increasing consistency and cohesiveness in the flow discharging grain and reduce the amount of grain remaining near a discharge end of the unloading tube when the door is in the closed position.

17 Claims, 9 Drawing Sheets

POSITIVE OPEN GRAIN SAVING UNLOADING SYSTEM

TECHNICAL FIELD

The present invention relates to an unloading system for an agricultural harvesting machine, and more particularly, to a grain saving unloading system for reducing grain by detaining a grain saver door after movement to a fully open position, allowing unopposed flow of grain during the unloading process, and by rapidly returning the door to a closed position with sufficient force for urging grain in the door area back into the tube a predetermined time after the unloading process pauses or ceases.

BACKGROUND ART

Unloading of grain from harvesters such as combines, is typically accomplished using an elongate unloading tube including a helical auger contained therein. The unloading tube has a discharge opening through which grain is propelled by rotation of the auger. During an unloading process of the combine, grain is moved from a grain tank of the harvester to another tank or receptacle, such as on a truck or wagon.

A well-known problem associated with unloading systems of combine harvesters is that grain remaining in the unloading tube at the end of the unloading process can continue to dribble out of the discharge opening as the unloading tube is swung to its transport position. In addition, grain has been observed to dribble out of the discharge opening with the unloading tube in the transport position, particularly as the harvester is moved over rough terrain, up hills, and the like.

A variety of doors referred to as dribble doors, spill saver doors, or grain saver doors have been utilized in attempts to reduce the dribble problem. Usually these doors are biased, typically by a spring, to a closed position in covering relation to at least a portion of the discharge opening. As the auger rotates, grain is moved through the unloading tube to the discharge opening exerting a force against the door. As the force of the discharging grain increases, the spring yields allowing the door to open and the grain to discharge.

An observed shortcoming of these doors is that the biasing forces urging the door to the closed position tend to interfere with the flow of grain, especially when smaller or irregular amounts of grain are present. The force exerted against the door by the smaller or irregular amounts of grain may only be sufficient to partially open the door or to open the door by varying amounts as the amount of grain varies. The resulting flow of grain discharged may be irregular and/or varied, as influenced by the quantity of grain present, making it susceptible to redirection by wind drift. Even a small amount of wind drift can be significant because the grain is often unloaded while the combine is moving and the receiving vehicle is being driven or towed in parallel with the combine over rough terrain or furrows making steering difficult. Often the operator of the receiving vehicle may attempt to position one side or the other of the receiving vehicle more beneath the spout such that, with wind drift, the stream of grain will be directed more to the center of the receiving vehicle. This is facilitated by a tighter, more cohesive flow of discharging grain.

A variety of doors have been utilized in attempts to address these shortcomings. Reference in this regard, Reimer et al. U.S. Pat. No. 6,691,861 issued to Deere & Company, which discloses a dribble door pivotally mounted to a bottom periphery of an unloading tube, for preventing dribble when in a raised position, and which has a spout like shape to allow unobstructed grain flow when in a lowered position. However, a spring biases the door toward the raised position requiring the force exerted by the grain to maintain the door in the lowered position. As the discharging grain flow tapers off, the spring force can prematurely lift the door so as to trap an undesirable amount of grain at the discharge opening of the unloading tube. And, if a large quantity of grain remains, and the spring force is low or weak, the door can be opened by jarring and the like, so as to dribble grain.

Thus, what is sought is a grain unloading system which provides one or more of the capabilities, and overcomes one or more of the shortcomings and limitations, set forth above.

SUMMARY OF THE INVENTION

According to the present invention, what is provided is a grain unloading system which provides one or more of the capabilities, and overcomes one or more of the shortcomings and limitations, set forth above.

According to one preferred aspect of the invention, the grain unloading system includes a cylindrical shaped unloading tube defining an internal passage in connection with a discharge opening at an end of the tube. The tube contains a helical auger rotatable for conveying grain through the internal passage of the tube and discharging the grain through the discharge opening along a flow path. The invention includes a grain saver door pivotally mounted in connection with the unloading tube adjacent to the discharge opening. The door is supported for pivotal movement along a path between a closed position in covering relation to at least a lower region of the discharge opening through a range of partially open positions and a fully open position. A biasing element is disposed and configured in connection with the door, urging the door toward the closed position. The biasing element is further configured to be yieldable to a force exerted thereagainst by the door as a result of the rotation of the auger forcing the discharging grain against the door so as to allow the door to be movable, by the force, from the closed position through the range of partially open positions to the fully open position. A detent device is disposed and cooperatively configured with the biasing element for detaining the door when moved to the fully open position and subsequently when the force exerted by the door ceases.

According to another aspect of the invention, the detent device is further cooperatively configured with the biasing element such that when the detent device releases the door from the fully open position in a predetermined manner and the force exerted as a result of the discharging grain against the door is absent, the biasing element will urge the door toward the closed position with sufficient force to propel any grain along the path of the door or in the discharge opening into the unloading tube. This feature further prevents grain spillage because grain that would normally remain near the discharge opening is propelled further back into the tube. If the door were to open inadvertently, little or no grain is present at the opening to spill.

According to a feature of the invention, the door is attached to the unloading tube at a location below the flow path such that the door, in the fully open position, will be located beneath the flow path to allow the discharging of the grain thereover unopposed by the door.

According to additional features of the invention, the detent device can be configured to be manually operable so an operator of the machine or wagon can release the door from the fully open position. Alternately, the detent device can be configured to be automatically operable to release the door from the fully open position a predetermined length of time after cessation of rotation of the auger, such as when the unloading process is paused or completed. This results in the door remaining open to allow additional grain in the path of the door or in the discharge opening to fall away from the unloading tube. After this delay, the door is released from the fully open position propelling grain in the door area into the unloading tube.

According to another feature of the invention, the detent device includes an element disposed in the path of the door proximate the fully open position. The element is biased for yielding to the door when moving along the path toward the fully open position, and then being operable to return to the path for detaining the door in the fully open position thereafter. The detent device further includes a controllably operable device operable for removing the element from the path of the door for releasing the door from the fully open position.

Preferred apparatus of the system include, but are not limited to, a latching device controlled by a solenoid, fluid controlled actuators and electrically powered actuators.

DETAILED DESCRIPTION OF THE INVENTION

Figure 1:
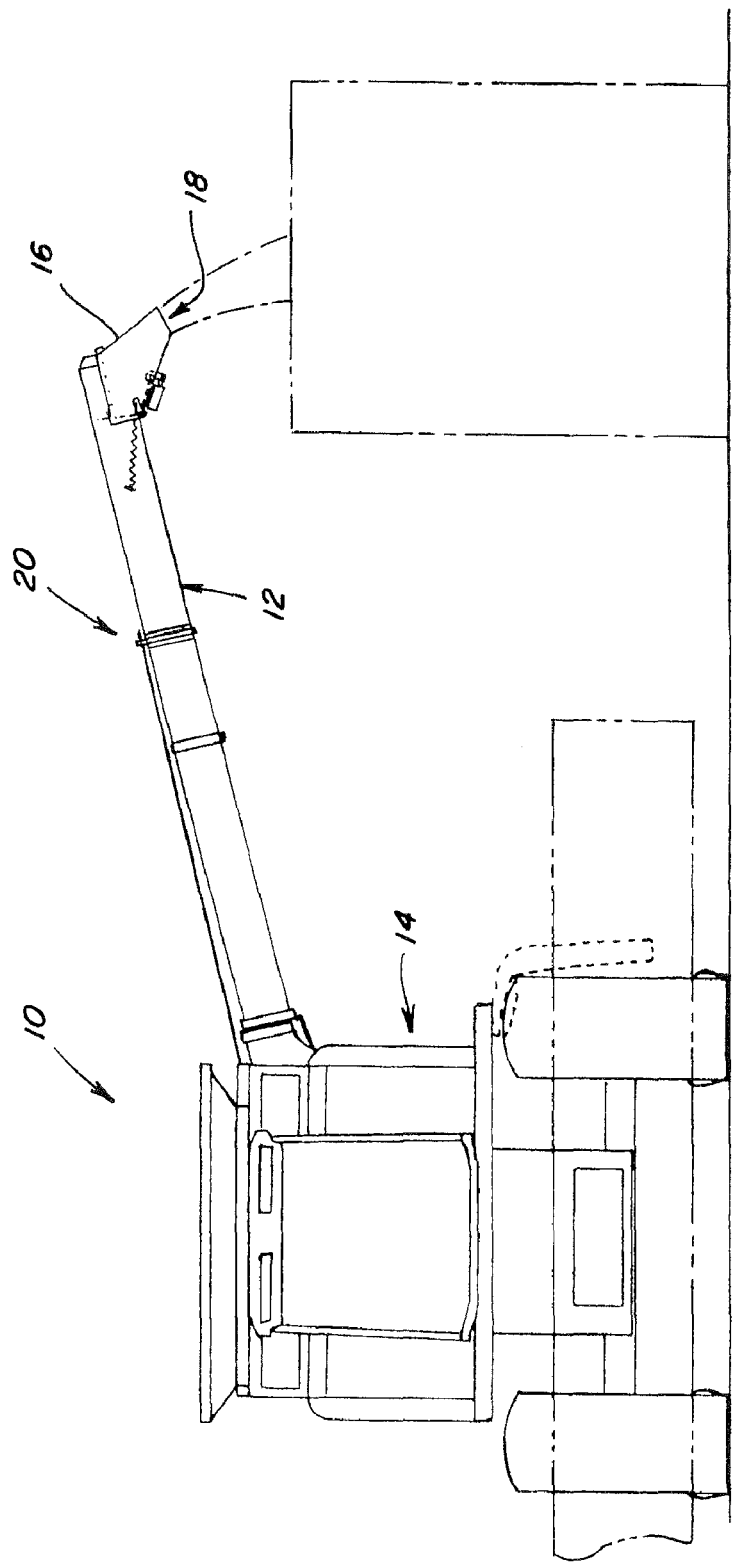
FIG. 1 is a simplified front view of a combine unloading grain into a receptacle.

Referring now to FIG. 1, a representative agricultural harvesting machine 10, which is a combine harvester of well-known construction and operation, is shown, including an unloading system 20 constructed and operable according to the teachings of the present invention. In FIG. 1, a cylindrical shaped unloading tube 12 is shown in a sidewardly and upwardly extending deployed or unloading position, for unloading grain into an accompanying container, which here is illustrated by a conventional agricultural grain wagon 14, in the well known manner. This is intended to be representative of a wide variety of unloading operations, wherein the flow of grain 16 from machine 10 is to be directed into a receiving container, such as wagon 14, periodically during operation of machine 10. When not in use, unloading tube 12 is stored in a position extending rearwardly (not shown) from machine 10, also in the well known manner.

Figure 2:
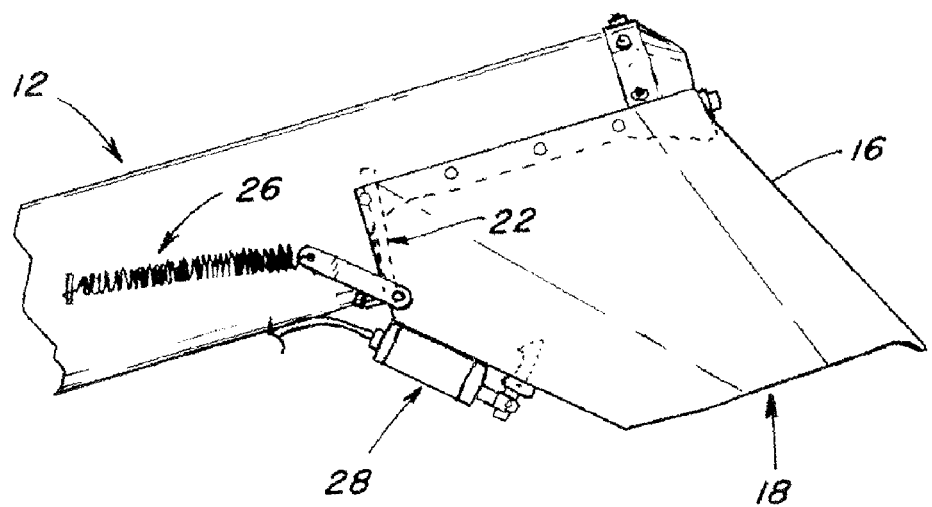
FIG. 2 is a partial view illustrating a discharge end of an unloading tube of the combine of FIG. 1 including the grain unloading system of the present invention depicting a grain saver door in a closed position.
Figure 3:
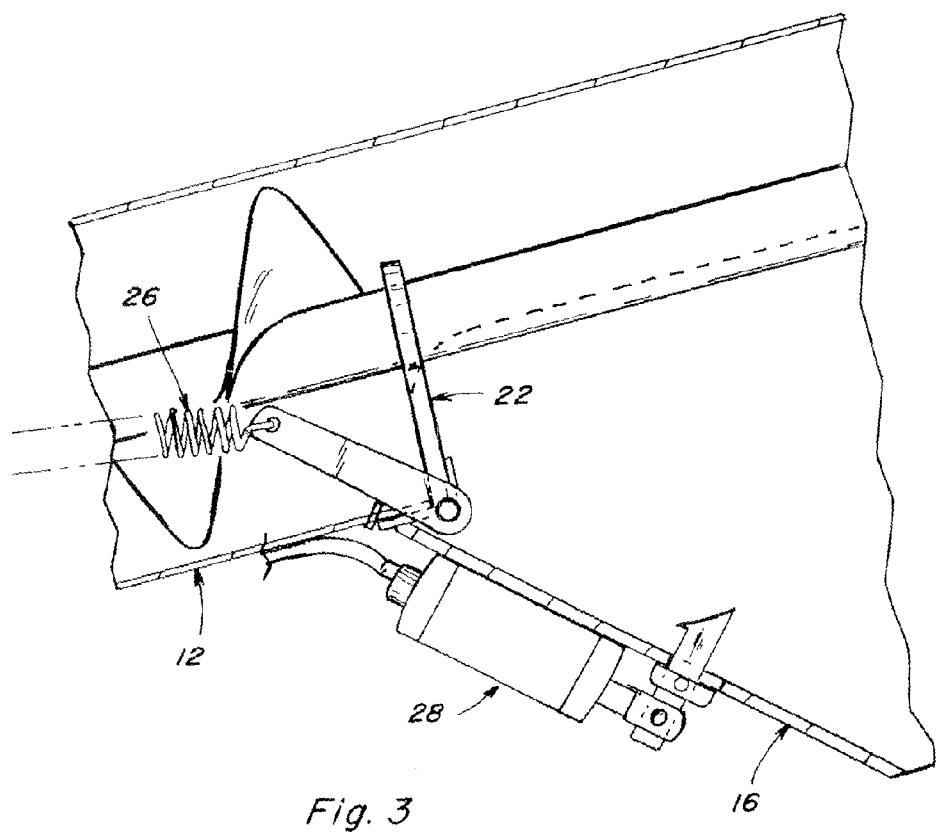
FIG. 3 is an enlarged partial cross sectional view of the unloading system of FIG. 2 depicting the grain saver door in the closed position.
Figure 4:
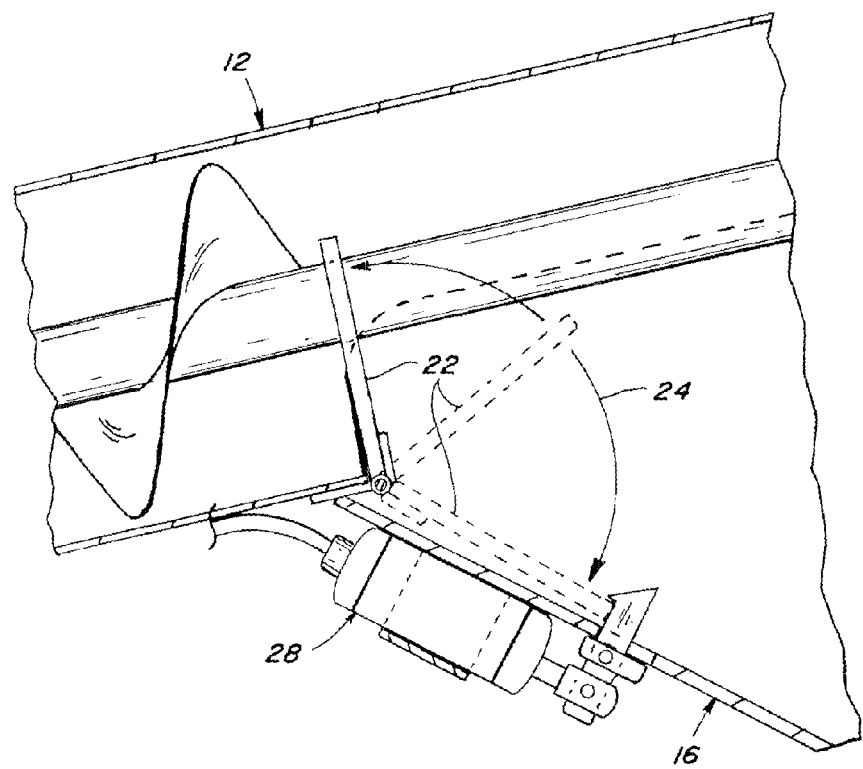
FIG. 4 is an enlarged partial cross sectional view illustrating the discharge end of the unloading tube of the combine of FIG. 1 including the grain unloading system of the present invention depicting a path of partially open positions of the grain saver door.
Figure 5:
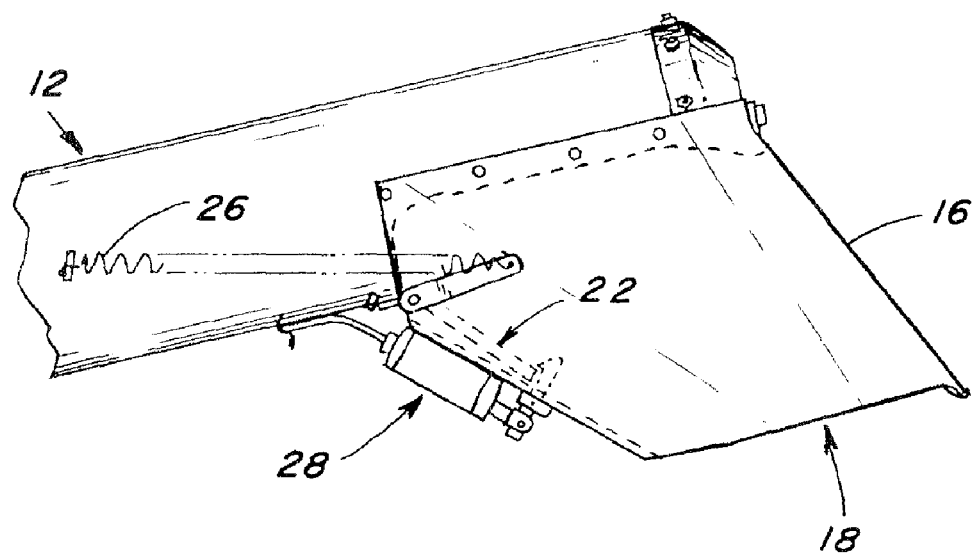
FIG. 5 is a partial view illustrating a discharge end of the unloading tube of the combine of FIG. 1 including the grain unloading system of the present invention depicting the grain saver door in a fully open position.
Figure 6:
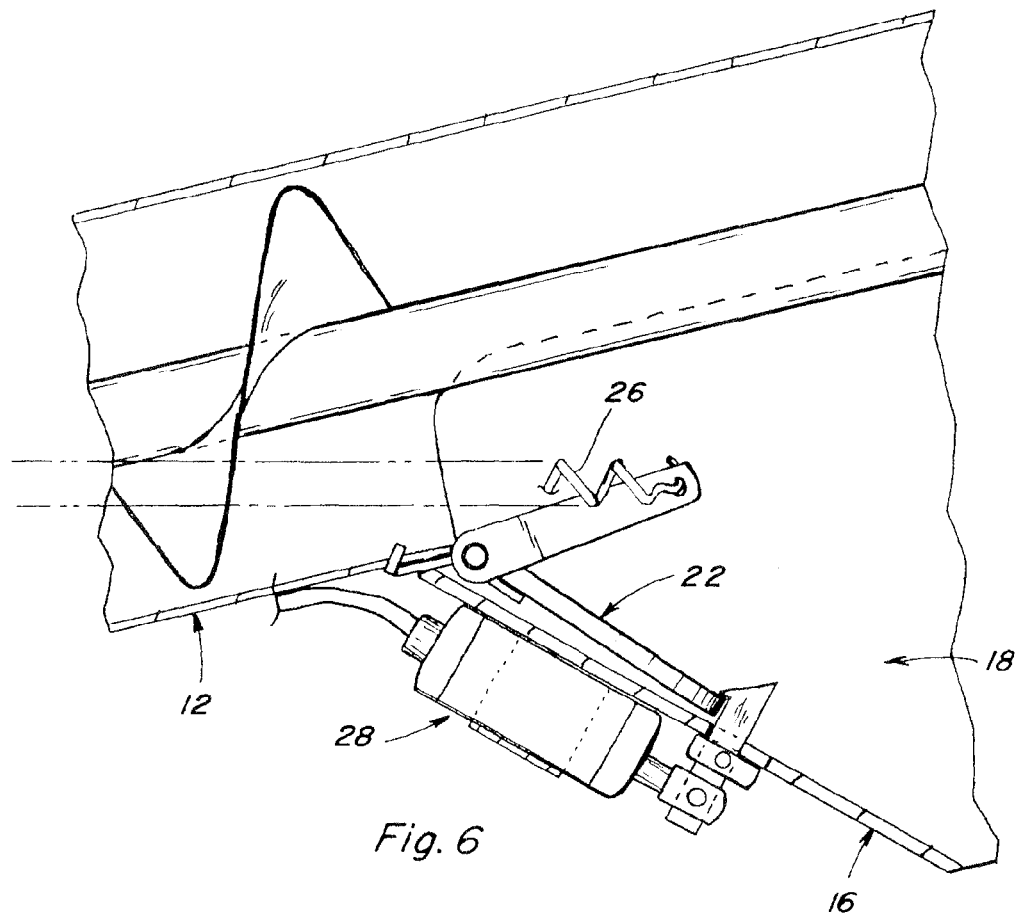
FIG. 6 is an enlarged partial cross sectional view of the unloading system of FIG. 5 depicting the grain saver door in the fully open position.

Unloading tube 12 defines an internal passage containing a helical auger rotatable for conveying grain through the internal passage of tube 12 and discharging the grain through a discharge opening 18 and a discharge spout 16 along a flow path as shown in FIG. 1. Grain unloading systems typically include a grain saver door 22 pivotally mounted in connection with unloading tube 12 adjacent to discharge opening 18 as can be seen in FIGS. 2-6. Door 22 is supported for pivotal movement along a path between a closed position in covering relation to at least a lower region of discharge opening 18 as seen in FIGS. 2 and 3 through a range of partially open positions depicted by arrow 24 in FIG. 4 and a fully open position as seen in FIGS. 5 and 6. A biasing element 26, shown here as a spring, is disposed and configured in connection with door 22, urging door 22 toward the closed position. Biasing element 26 is further configured so as to be yieldable to a force exerted thereagainst by door 22 as a result of the rotation of the auger forcing the discharging grain against door 22 so as to allow door 22 to be movable, by the force, from the closed position through the range of partially open positions to the fully open position.

As is well known, the biasing force urging door 22 to the closed position can interfere with the flow of grain when smaller or irregular amounts of grain are present making the flow susceptible to redirection by wind drift as discussed above. As the discharging grain flow tapers off, the biasing force can prematurely close door 22 so as to trap an undesirable amount of grain near discharge opening 18 of unloading tube 12 creating a risk of loss due to spillage or dribble.

Referring now to FIGS. 5-6, an unloading system 20 of the present invention improves the cohesiveness and consistency of the flow of grain by providing a detent device 28 disposed and cooperatively configured with biasing element 26 for detaining door 22 when moved to the fully open position and subsequently when the force exerted by door 22 ceases. As an advantage, the flow of grain is not affected by a varying door position so even when only small amounts of grain are being discharged, such as when the grain tank is nearly empty. The smaller or irregular amounts of grain are discharged without the need to exert force against door 22 just to maintain door 22 in the open position. As a result, the grain is allowed to flow unopposed, as if no door was present, such that it is discharged in a more cohesive, predictable flow of grain.

Figure 7:
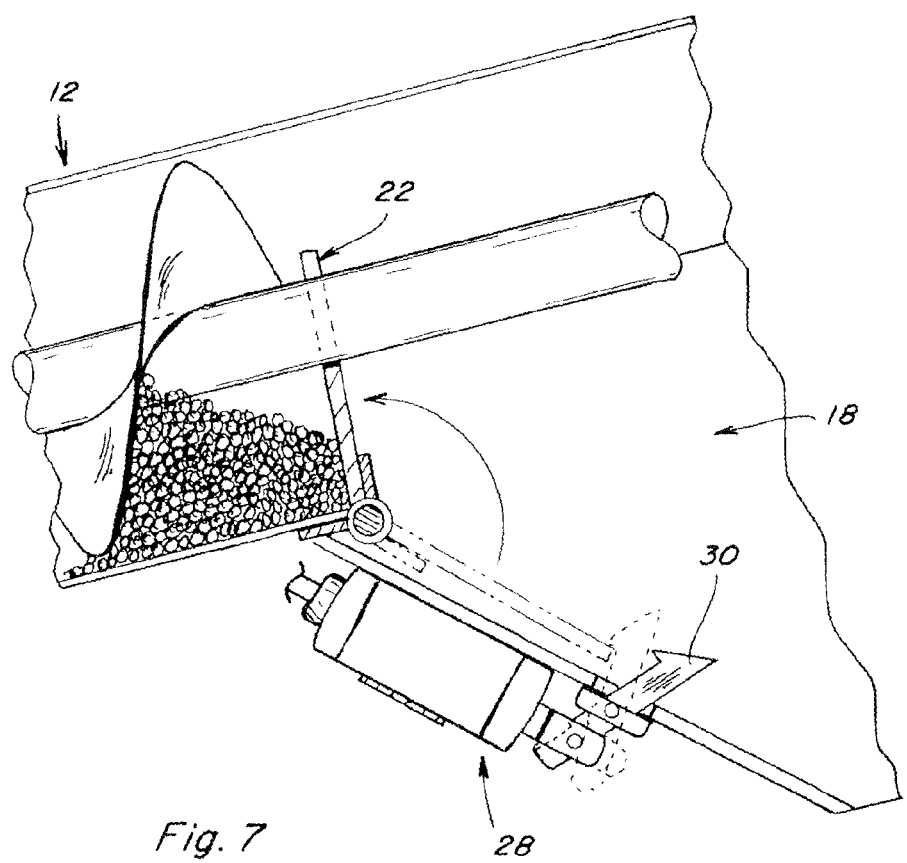
FIG. 7 is a cross sectional view of the unloading system illustrating operation of the unloading system during a pause in the unloading process illustrating grain remaining in the unloading tube.

Detent device 28 is further cooperatively configured with biasing element 26 such that when detent device 28 releases door 22 from the fully open position in a predetermined manner and the force exerted as a result of the discharging grain against door 22 is absent, biasing element 26 will urge door 22 toward the closed position with sufficient force to propel any grain along the path of door 22 or in discharge opening 18 into unloading tube 12. Advantageously, as the grain is propelled into tube 12, the amount of grain remaining at discharge opening 18 is reduced as illustrated in FIG. 7. Even if door 22 were to open inadvertently, such as when machine 10 moves over rugged or hilly terrain, less grain is present at opening 18 to dribble or spill.

Door 22 is preferably attached to unloading tube 12 at a location below the flow path such that door 22, in the fully open position, will be located beneath the flow path to allow the discharging of the grain thereover unopposed by door 22 to further ensure a cohesive flow of discharging grain as if not door were present.

Figure 11:
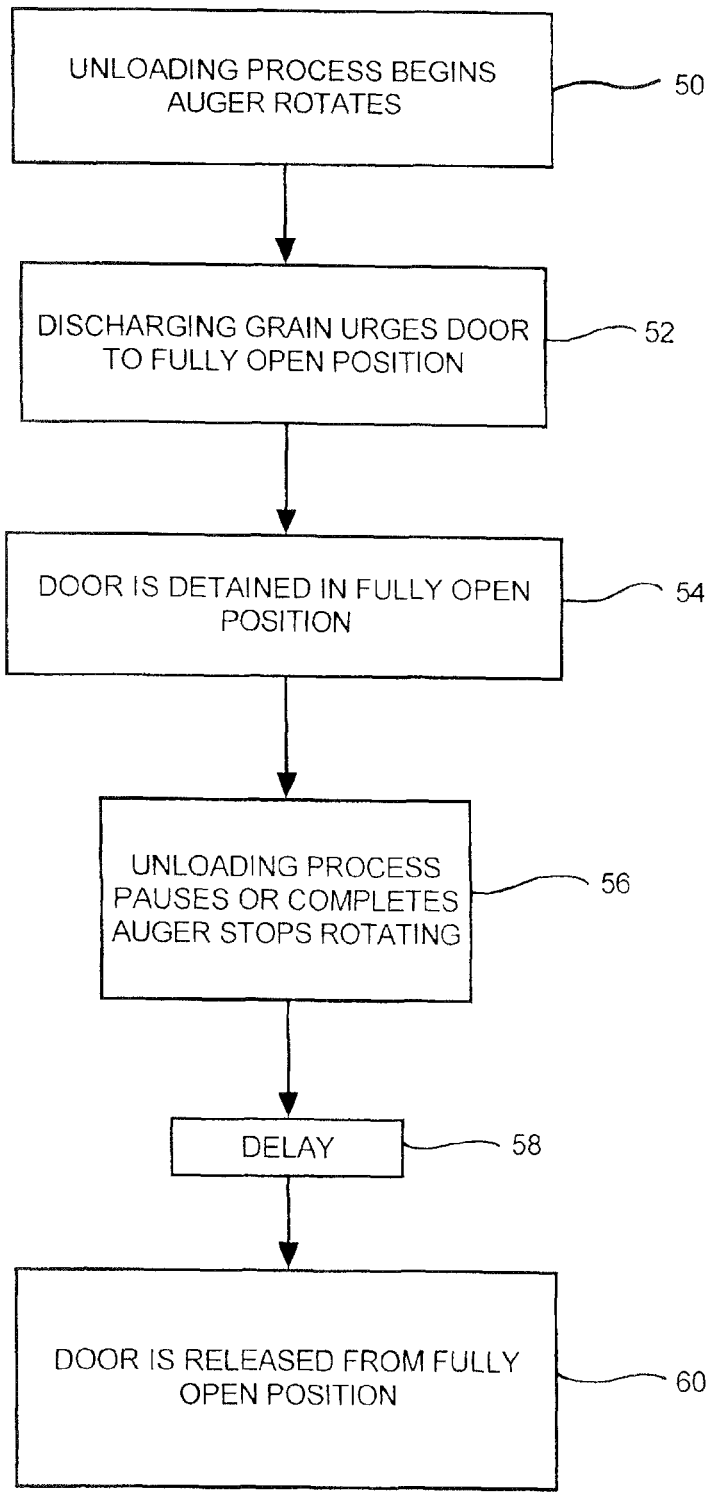
FIG. 11 is a flow diagram illustration an automatic operation of the grains unloading system of the present invention.

Detent device 28 can be configured to be manually operable so an operator of machine 10 or wagon 14 can release door 22 from the fully open position. Alternately, detent device 28 can be configured to be automatically operable to release door 22 from the fully open position a predetermined length of time after cessation of rotation of the auger, such as when the unloading process is paused or completed. FIG. 11 includes a flow diagram of the automatic process. At block 50, the unloading process begins and the rotation of the auger moves grain toward discharge opening 18 through unloading tube 12. The discharging grain urges door 20 from its closed position to the fully open position as seen at block 52. Unloading system 20 operates to detain door 20 in the fully open position as shown in block 54. When the auger stops rotating, indicating a pause of completion of the unloading process, unloading system 20 waits a predetermined time before releasing door 22 from the fully open position as seen in blocks 56, 58, 60. During this delay, additional grain in the path of door 22 or in discharge opening 18 is allowed to fall from unloading tube 12 before door 22 is released propelling remaining grain in the door area into unloading tube 22.

Figure 8:
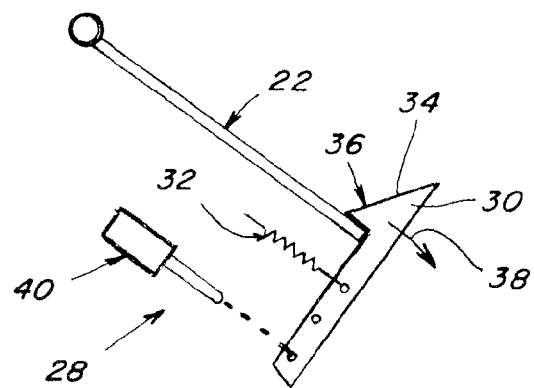
FIG. 8 is a schematic representation of a preferred embodiment of a detent device according to the present invention.

As illustrated in FIGS. 2-6, detent device 28 includes an element 30 disposed in the path of door 22 proximate the fully open position. Element 30 is biased for yielding to door 22 when moving along the path toward the fully open position and operable to return to the path for detaining door 22 in the fully open position thereafter. A schematic of a representative detent device is shown in FIG. 8 in which element 30 is biased, such as by a spring 32, for yielding to door 22 when moving along the path toward the fully open position. When opening, door 22 exerts a force represented by arrow 36 on a surface 34 of element 30. Spring 32 yields to force 36 and element 30 pivots in the direction of arrow 38 allowing door 22 to reach the fully open position. Once door 22 is in the fully open position, spring 32 urges element 30 to its position in the path of door 22 for detaining door 22 in the fully open position thereafter. Detent device 28 further includes a controllably operable device 40 operable for removing element 30 from the path of door 22 for releasing door 22 from the fully open position.

Figure 9:
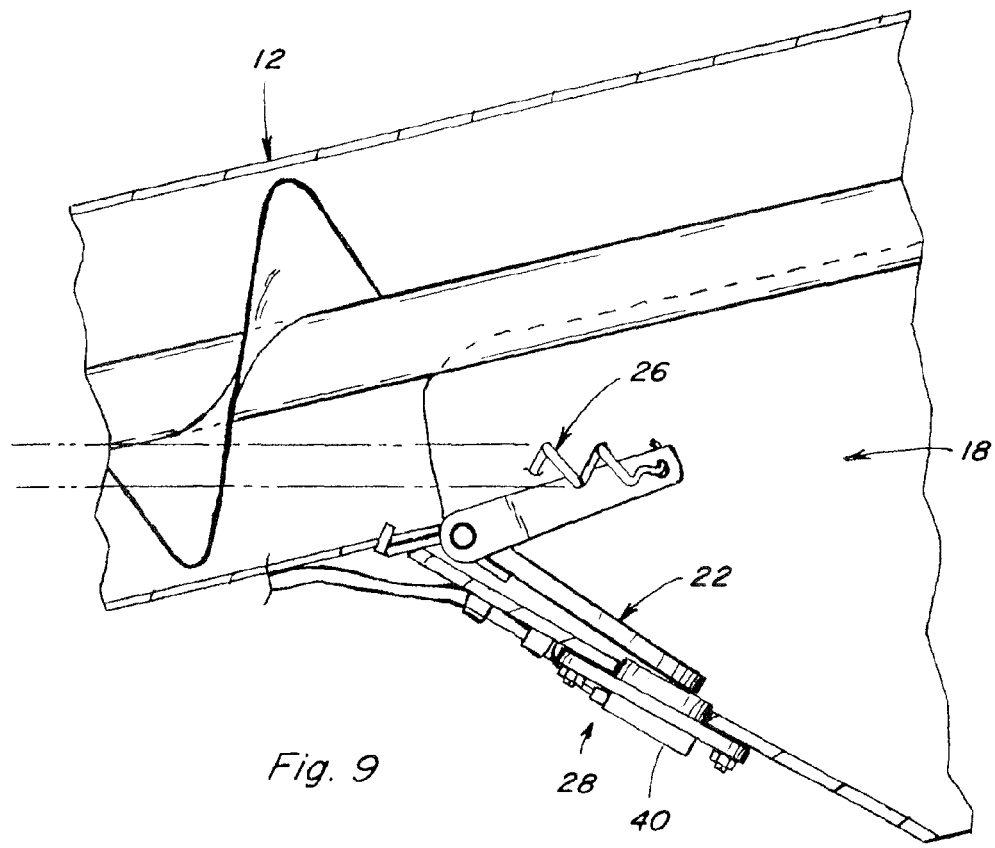
FIG. 9 is an enlarged partial cross sectional view of the unloading system illustrating an alternate embodiment of a detent device according to the present invention.

Turning now to FIG. 9 wherein an alternate embodiment of detent device 28 is depicted. Once door 22 reaches the fully open position, electromagnet 40 detains door 22 in the fully open position. Further electromagnet 40 can be manually or automatically operable to release door 22 from the fully open position to the closed position.

Figure 10:
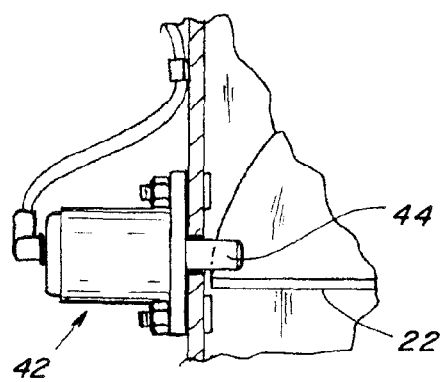
FIG. 10 is an enlarged partial cross sectional view of an another embodiment of a detent device according to the present invention.

Yet another embodiment of detent device 28 is shown in FIG. 10. Once door 22 has moved to the fully open position, element 44 of detent device 28 extends from the side into the path of door 22 detaining it in the fully open position, until solenoid 42 is activated (either manually or automatically) to release door 22 from the fully open position.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A grain unloading system for an agricultural combine, comprising:
    a cylindrical shaped unloading tube defining an internal passage in connection with a discharge opening at an end of the tube, the tube containing a helical auger rotatable for conveying grain through the internal passage of the tube and discharging the grain through the discharge opening along a flow path;
    a grain saver door pivotally mounted in connection with the unloading tube adjacent to the discharge opening, the door being supported for pivotal movement along a path between a closed position in covering relation to at least a lower region of the discharge opening through a range of partially open positions and a fully open position for allowing discharging of grain from the opening;
    a biasing element disposed and configured in connection with the door, urging the door toward the closed position, the biasing element being further configured so as to be yieldable to a force exerted thereagainst by the door as a result of the rotation of the auger forcing the discharging grain against the door so as to allow the door to be movable by the force from the closed position through the range of partially open positions to the fully open position; and
    a detent device disposed and cooperatively configured with the biasing element for detaining the door when moved to the fully open position and subsequently when the force exerted by the door ceases, wherein the detent device includes an element disposed in the path of the door proximate the fully open position, the element being biased for yielding to the door when moving along the path toward the fully open position, and the element being operable to return to the path for detaining the door in the fully open position thereafter, the detent device further including a controllably operable device operable for removing the element from the path of the door for releasing the door from the fully open position.

2. The grain unloading system of claim 1, wherein the detent device is further cooperatively configured with the biasing element such that when the detent device releases the door from the fully open position in a predetermined manner and the force exerted as a result of the discharging grain against the door is absent, the biasing element will urge the door toward the closed position with a sufficient force to propel any grain along the path of the door or in the discharge opening into the unloading tube.

3. The grain unloading system of claim 1, wherein the door is attached to the unloading tube at a location below the flow path such that the door in the fully open position will be located beneath the flow path to allow the discharging of the grain thereover unopposed by the door.

4. The grain unloading system of claim 1, wherein the detent device is configured to be operable by an operator to release the door from the fully open position.

5. The grain unloading system of claim 2, wherein the detent device is configured to be automatically operable to release the door from the fully open position a predetermined length of time after cessation of rotation of the auger.

6. The grain unloading system of claim 1, wherein the controllably operable device is configured to be automatically operable to remove the element from the path of the door a predetermined length of time after cessation of rotation of the auger.

7. The grain unloading system of claim 1, wherein the controllably operable device comprises a solenoid.

8. The grain unloading system of claim 1, wherein the controllably operable device comprises an electromagnet.

9. A grain unloading system for an agricultural combine, comprising:

a tube having an interior passage containing a helical auger rotatable for conveying grain through the passage and an outer end portion including a discharge opening in connection with the interior passage and through which the grain will be discharged along a flow path by the auger when rotating;

a grain saver door pivotally mounted in connection with the tube adjacent to the discharge opening, the door being pivotally movable along a path between a closed position wherein the door covers at least a lower portion of the discharge opening for preventing dribbling of grain therefrom, through a range of partially open positions and a fully open position wherein the door allows essentially unimpeded discharging of grain from the opening;

a biasing element disposed and configured in connection with the door, urging the door toward the closed position, the biasing element being further configured for allowing pivotal movement of the door from the closed position, through the range of partially open positions to the fully open position, in response to a force exerted thereagainst by the door as a result of the rotation of the auger forcing grain against the door; and a detent device disposed and cooperatively configured with the biasing element for allowing the door to move to the fully open position and detaining the door in the fully open position subsequently when the force exerted by the door decreases, wherein the detent device includes an element disposed in the path of the door proximate to the fully open position, the element being biased for yielding to the door when moving along the path toward the fully open position, and the element being operable for returning to the path for detaining the door in the fully open position thereafter, the detent device further including a controllably operable device operable for removing the element from the path of the door for releasing the door from the fully open position.

10. The grain unloading system of claim 9, wherein the detent device is further cooperatively configured with the biasing element such that when the detent device releases the door from the fully open position in a predetermined manner and the force exerted as a result of the discharging grain against the door is absent, the biasing element will urge the door toward the closed position with a sufficient force to propel any grain along the path of the door or in the discharge opening into the unloading tube.

11. The grain unloading system of claim 9, wherein the door is attached to the unloading tube at a location below the flow path such that the door in the fully open position will be located beneath the flow path to allow the unopposed discharge of the grain thereover.

12. The grain unloading system of claim 9, wherein the detent device is configured to be operable by an operator to release the door from the fully open position.

13. The grain unloading system of claim 10, wherein the detent device is configured to be automatically operable to release the door from the fully open position a predetermined length of time after cessation of rotation of the auger.

14. The grain unloading system of claim 9, wherein the controllably operable device is configured to be automatically operable to remove the element from the path of the door a predetermined length of time after cessation of rotation of the auger.

15. The grain unloading system of claim 9, wherein the controllably operable device comprises a solenoid.

16. A grain unloading system for an agricultural harvester, comprising:

a door hingedly connected to a lower portion of an unloading tube for pivotal movement along a path between a closed position covering at least a lower portion of a discharge opening of the tube for preventing dribbling of grain from the opening, through a range of partially open positions, and a fully open position wherein the door will be located below a flow of grain being discharged from the opening, the door being biased towards the closed position and pivotably openable along the path of partially open positions to the fully open position in response to a force exerted against the door as a result of an auger disposed in the unloading tube being rotated for conveying grain through the tube toward the discharge opening and forcing grain against the door; and a detent device disposed and configured for receiving and subsequently detaining the door in the fully open position independent of the force exerted against the door by the grain, the device being controllably operable in a predetermined manner when the force exerted against the door is absent for releasing the door from the fully open position to the closed position with sufficient force to propel grain in the path of the door or near the discharge opening of the tube further into the tube, wherein the detent device is configured to be automatically operable to detain the door after movement to the fully open position and subsequently during rotation of the auger and to release the door from the fully open position a predetermined length of time after cessation of rotation of the auger.

17. The grain unloading system of claim 16, wherein the detent device includes a solenoid controlled latching element.

* * * * *